US011904499B2

(12) United States Patent
Klöppner et al.

(10) Patent No.: US 11,904,499 B2
(45) Date of Patent: Feb. 20, 2024

(54) DEVICE FOR PRODUCING CONCRETE BLOCKS

(71) Applicant: Franz Carl Nüdling Basaltwerke GmbH + Co. KG, Fulda (DE)

(72) Inventors: Bernhard Klöppner, Eichenzell-Rothemann (DE); Bernd Büttner, Bischofsheim (DE); Steffen Mothes, Weimar-Taubach (DE)

(73) Assignee: Franz Carl Nüdling Basaltwerke GmbH + Co. KG, Fulda (DE)

( * ) Notice: Subject to any disclaimer, the term of this patent is extended or adjusted under 35 U.S.C. 154(b) by 0 days.

(21) Appl. No.: 17/745,943

(22) Filed: May 17, 2022

(65) Prior Publication Data

US 2022/0274284 A1 Sep. 1, 2022

Related U.S. Application Data

(63) Continuation of application No. 16/645,874, filed as application No. PCT/EP2019/054566 on Feb. 25, 2019, now Pat. No. 11,364,655.

(30) Foreign Application Priority Data

Sep. 6, 2018 (DE) ........................ 102018121741.2

(51) Int. Cl.
*B28B 3/06* (2006.01)
*B28B 3/02* (2006.01)
*B28B 13/02* (2006.01)

(52) U.S. Cl.
CPC ................ *B28B 3/06* (2013.01); *B28B 3/021* (2013.01); *B28B 13/023* (2013.01)

(58) Field of Classification Search
CPC . B28B 13/022; B28B 13/023; B28B 13/0245; B28B 13/06; B28B 1/005; B28B 7/40
See application file for complete search history.

(56) References Cited

U.S. PATENT DOCUMENTS 2,934,807 A * 5/1960 Donati .................. B28B 13/023 425/432
4,249,358 A 2/1981 Thieffry
(Continued)

FOREIGN PATENT DOCUMENTS

DE 19841065 A1 3/2000
DE 10137151 C1 4/2003
(Continued)

OTHER PUBLICATIONS

Deutsches Patent—Und Markenamt (German Patent and Trademark Office), Recherchenbericht (search in a related application), Jan. 14, 2019.

(Continued)

*Primary Examiner* — Kelly M Gambetta
*Assistant Examiner* — Virak Nguon
(74) *Attorney, Agent, or Firm* — Laurence P. Colton; SMITH TEMPEL BLAHA LLC

(57) ABSTRACT

A device for producing concrete blocks, in particular concrete paving slabs, having a mold for filling with a concrete mixture, wherein the mold has at least one mold cavity for receiving the concrete mixture, and wherein the upwardly open mold cavity has walls as lateral boundaries, and wherein the at least one mold cavity can be filled with the concrete mixture by means of a filling device, and wherein the mold with the at least one mold cavity and the filling device are movable relative to one another in a filling axis. The filling axis is oriented obliquely to an axis of symmetry of the at least one mold cavity, with the result that preferably all of the walls of the mold cavity extend neither perpendicularly nor parallel to the filling axis, but at an angle.

10 Claims, 10 Drawing Sheets

(56) References Cited

U.S. PATENT DOCUMENTS

| | | | | |
|---|---|---|---|---|
| 2004/0104332 | A1 | 6/2004 | Rampf | |
| 2007/0234679 | A1 * | 10/2007 | Metten .................. | B28B 13/022 52/741.1 |
| 2021/0053250 | A1 | 2/2021 | Barab | |

FOREIGN PATENT DOCUMENTS

| | | | | |
|---|---|---|---|---|
| DE | 102011050367 | B4 | 11/2012 | |
| DE | 202014004045 | U1 | 6/2014 | |
| DE | 202013003472 | U1 | 7/2014 | |
| EP | 1225016 | A2 | 7/2002 | |
| EP | 1930142 | A2 | 11/2007 | |
| EP | 1930142 | A2 * | 6/2008 | ........... B28B 13/022 |

OTHER PUBLICATIONS

WIPO, International Search Report (in the priority application), dated Jul. 22, 2019.

* cited by examiner

Fig. 2
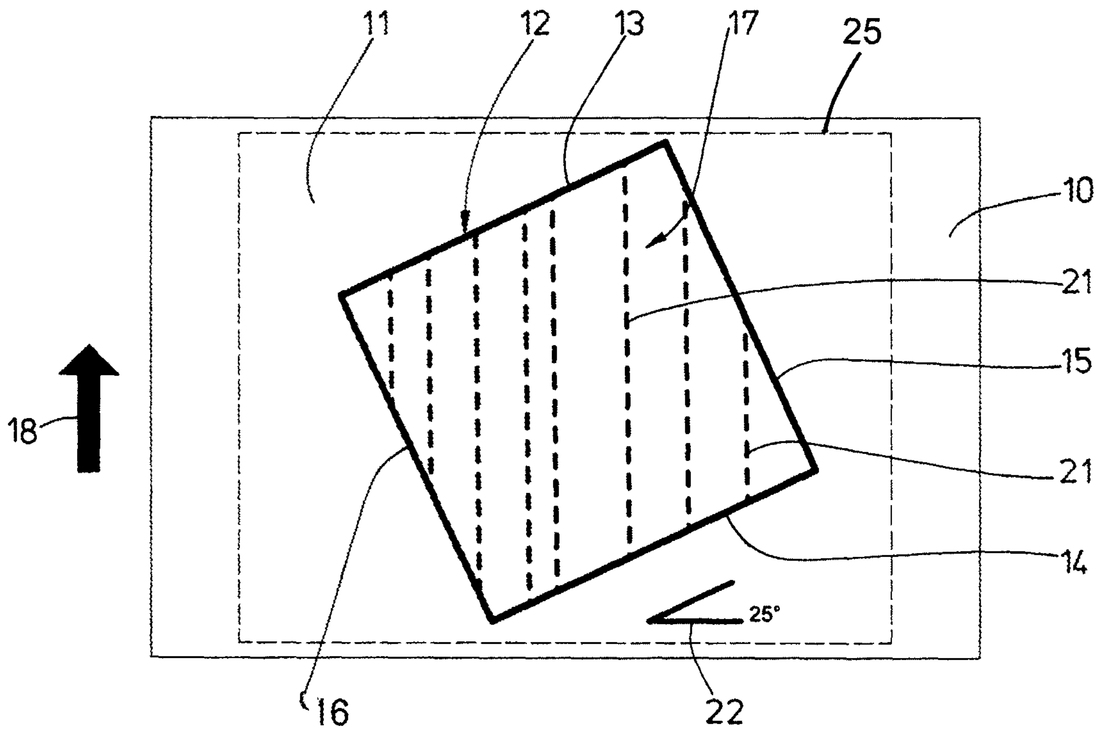
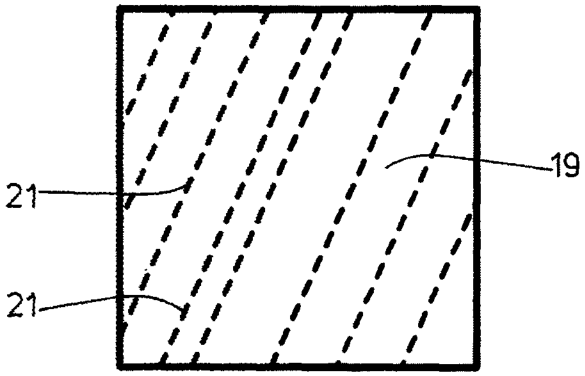
Fig. 3

Fig. 4
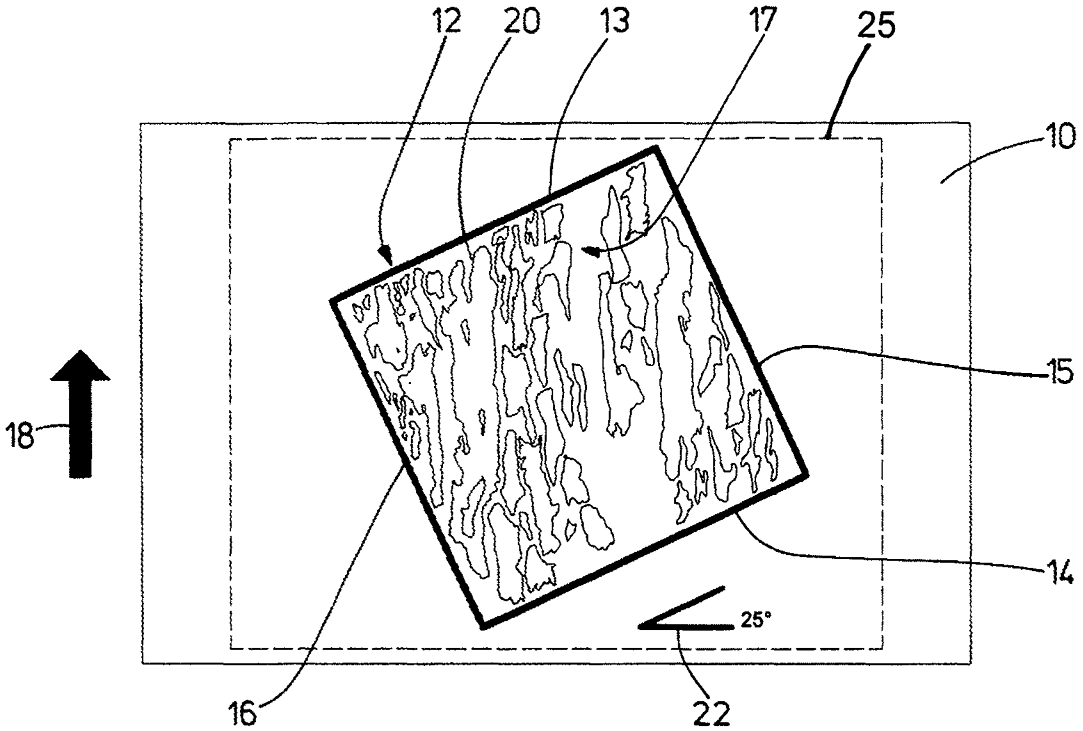
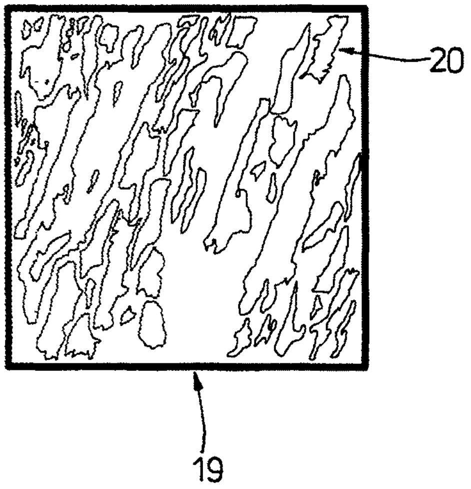
Fig. 5

Fig. 6
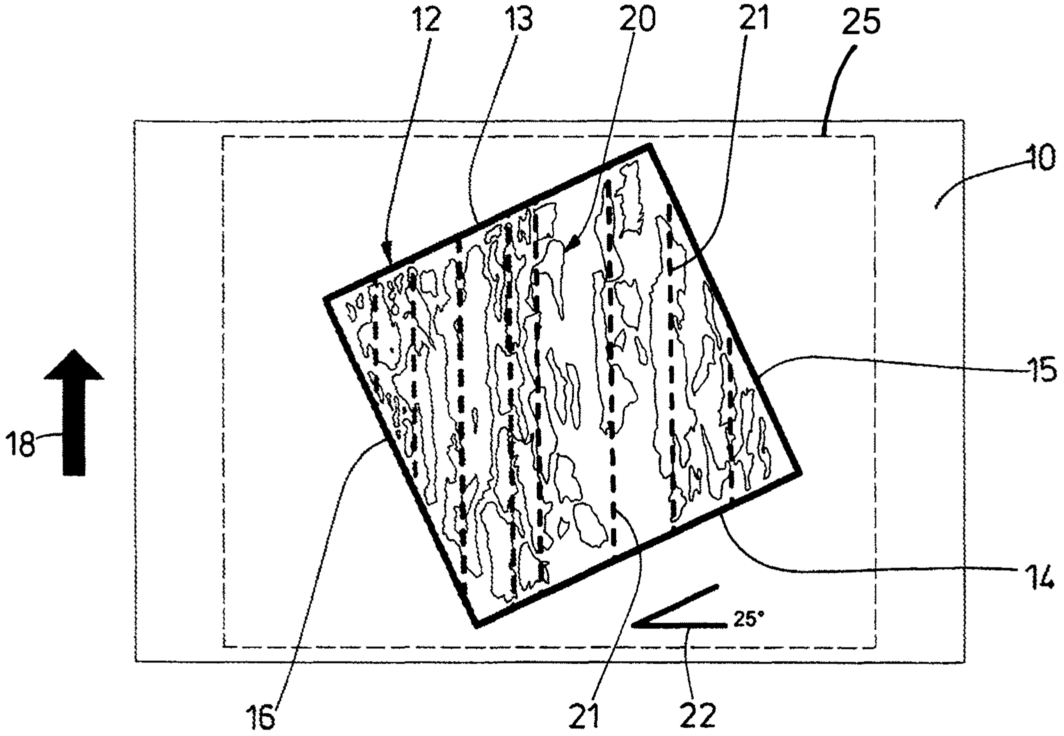
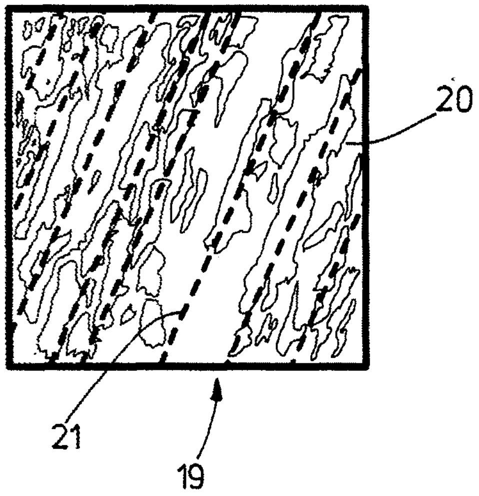
Fig. 7

Fig. 8
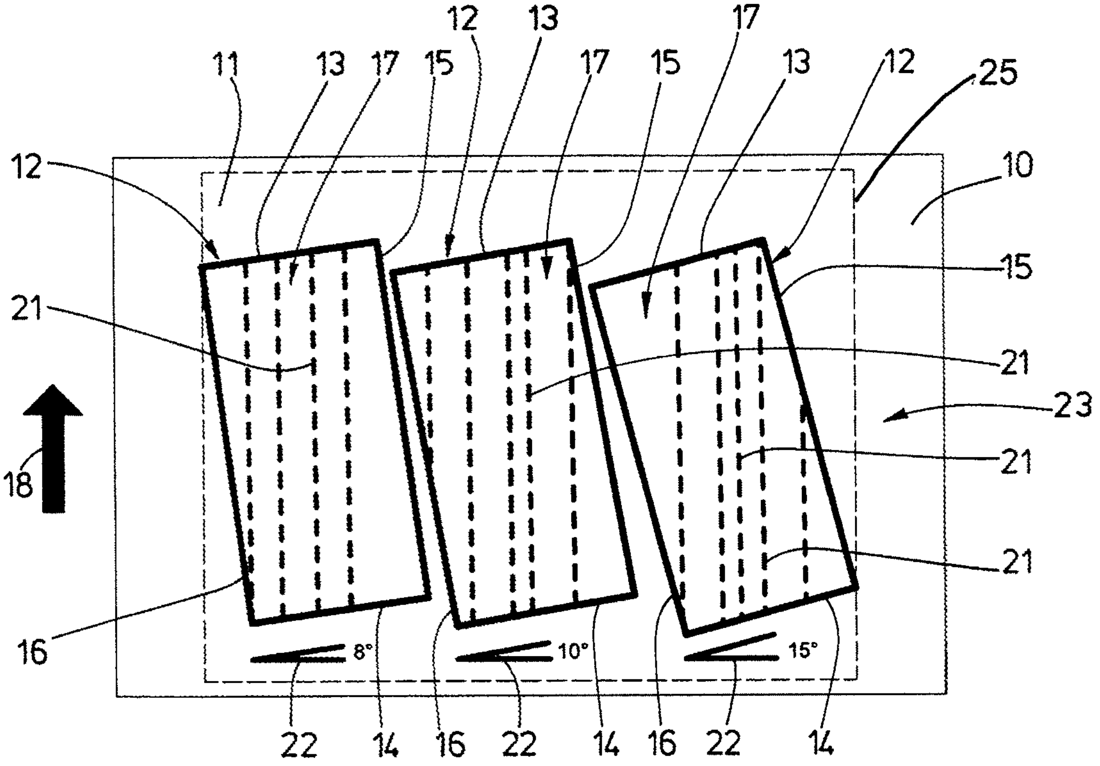
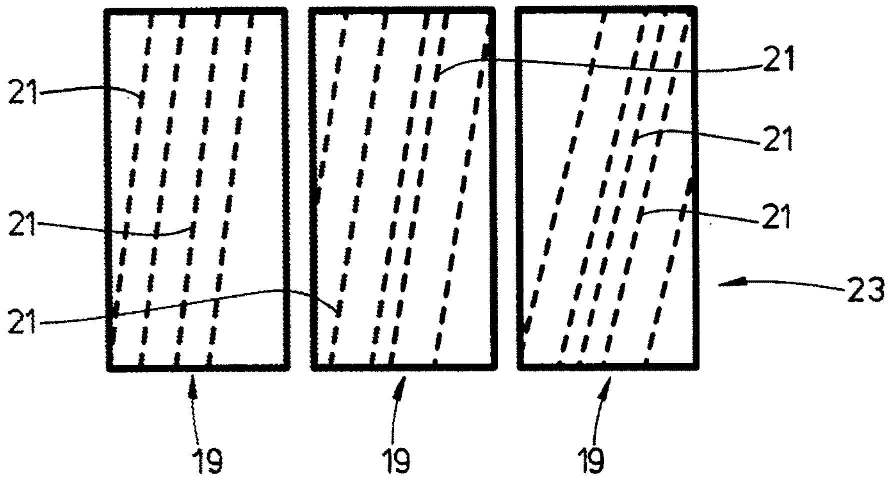
Fig. 9

Fig. 10
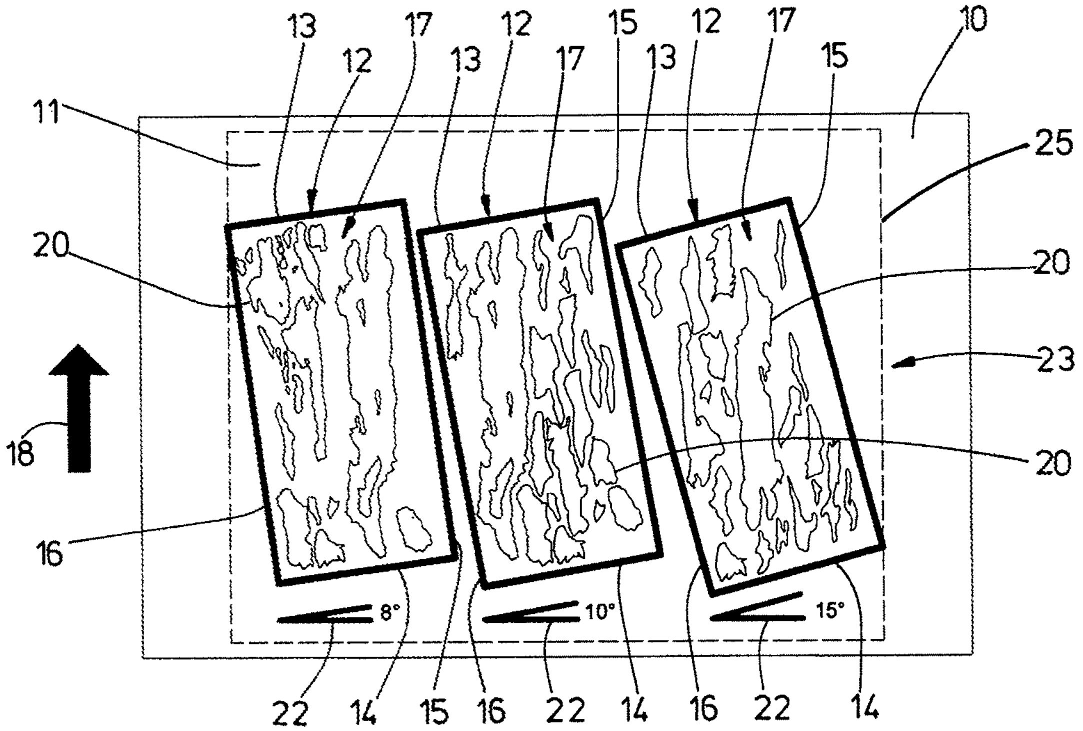
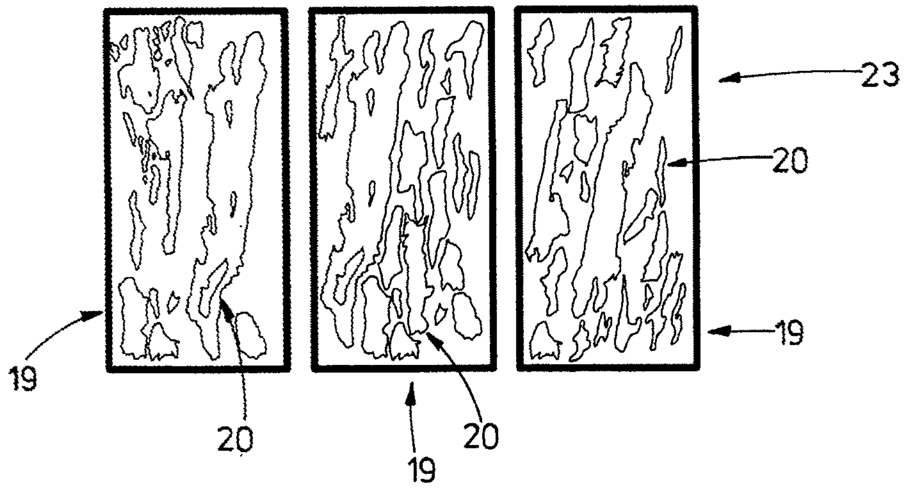
Fig. 11

Fig. 12
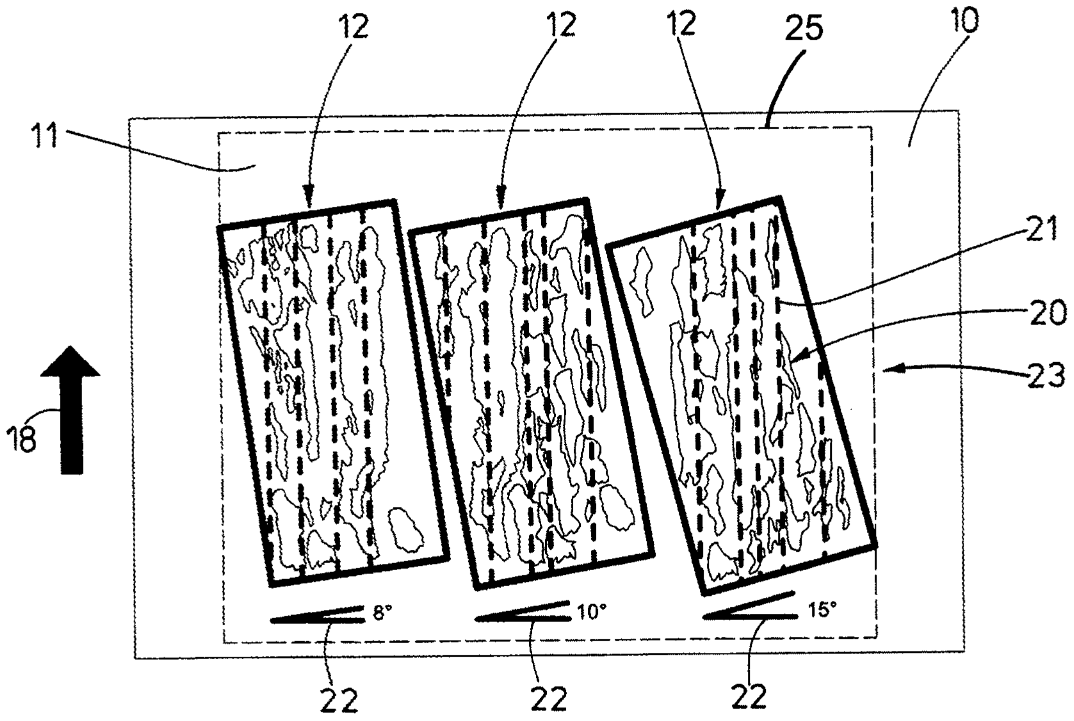
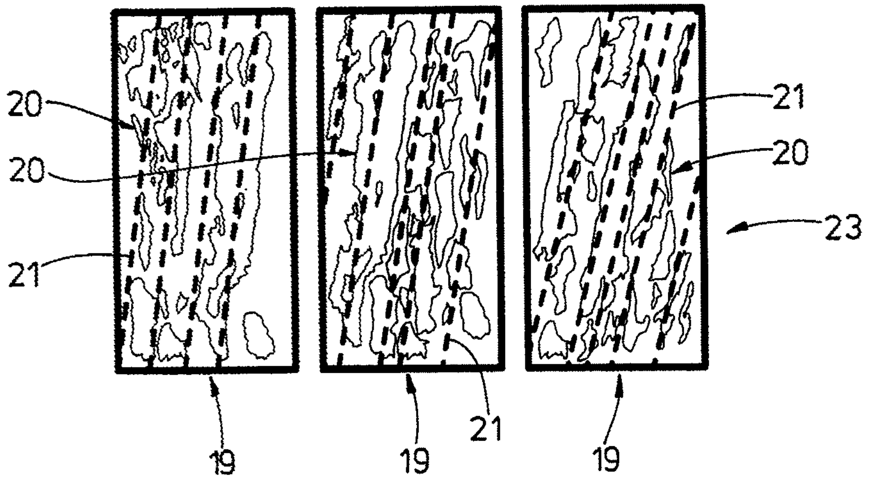
Fig. 13

Fig. 14
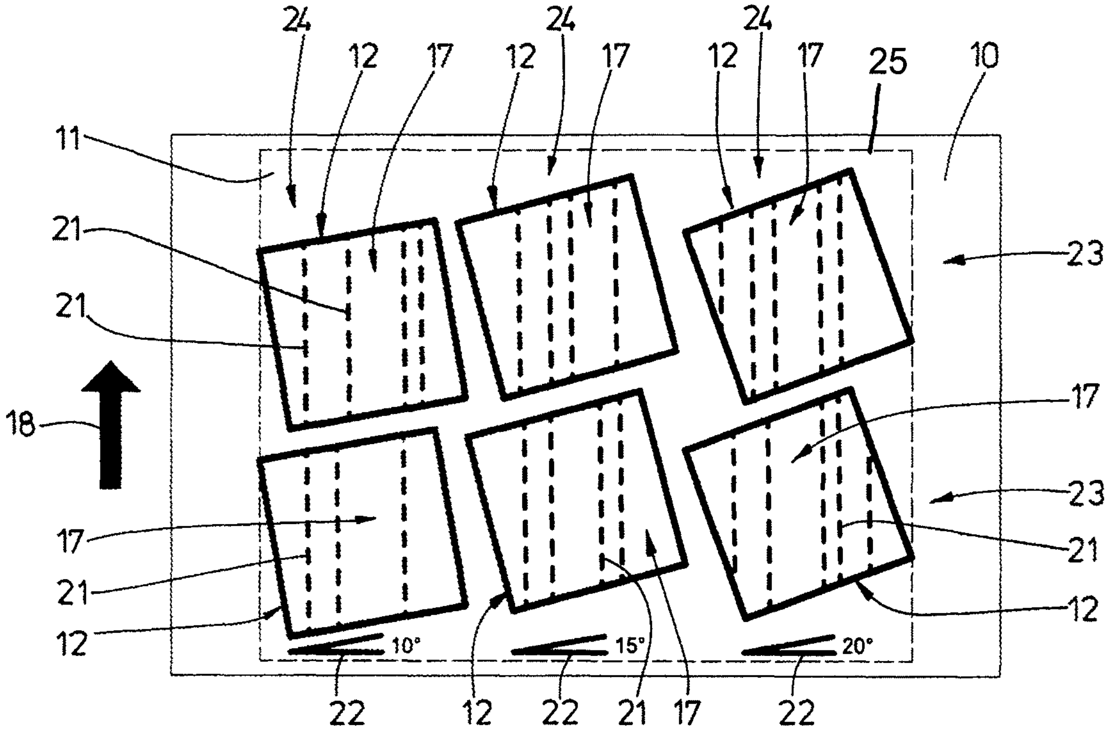
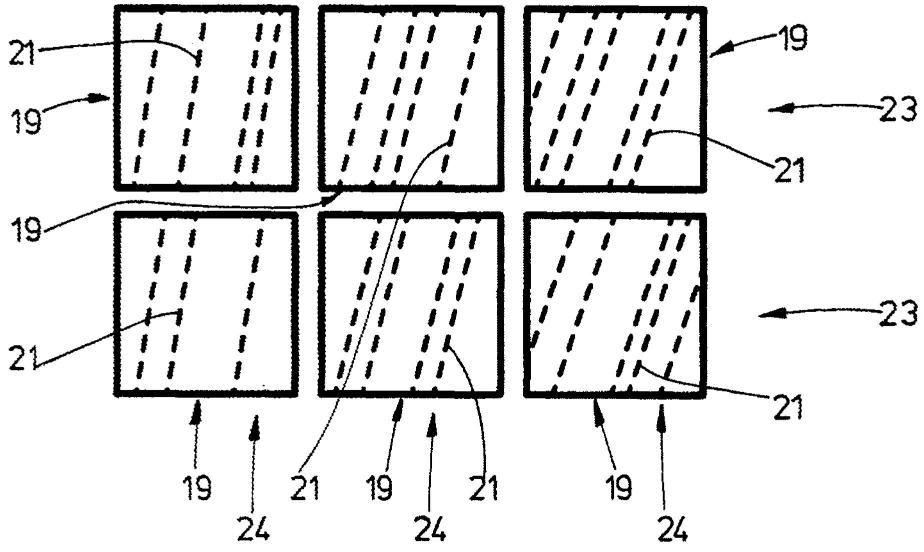
Fig. 15

Fig. 16
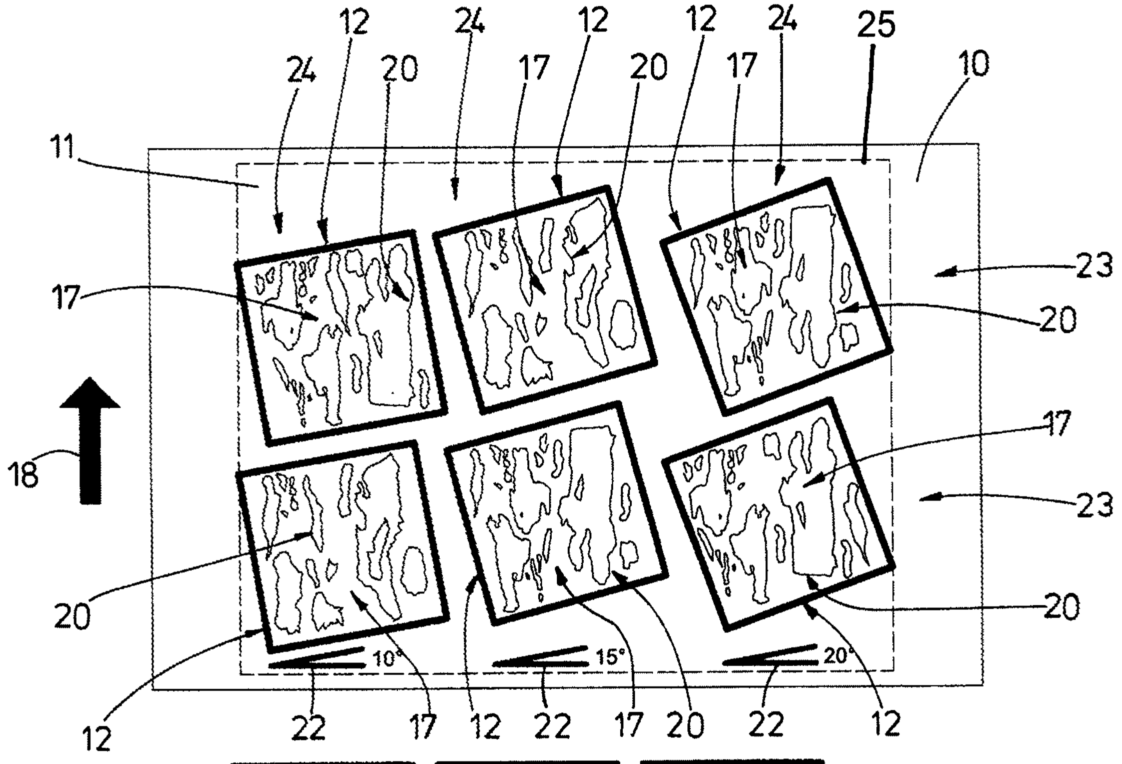
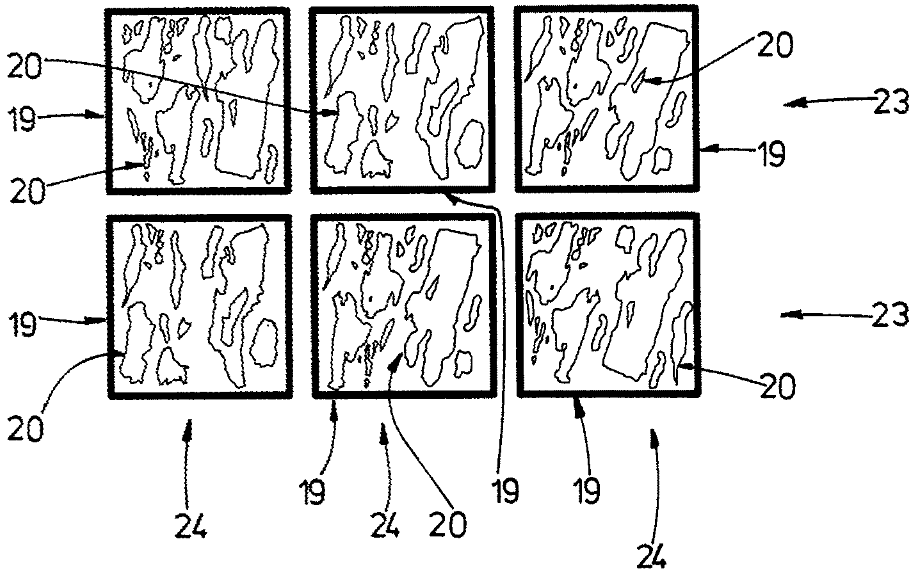
Fig. 17

Fig. 18
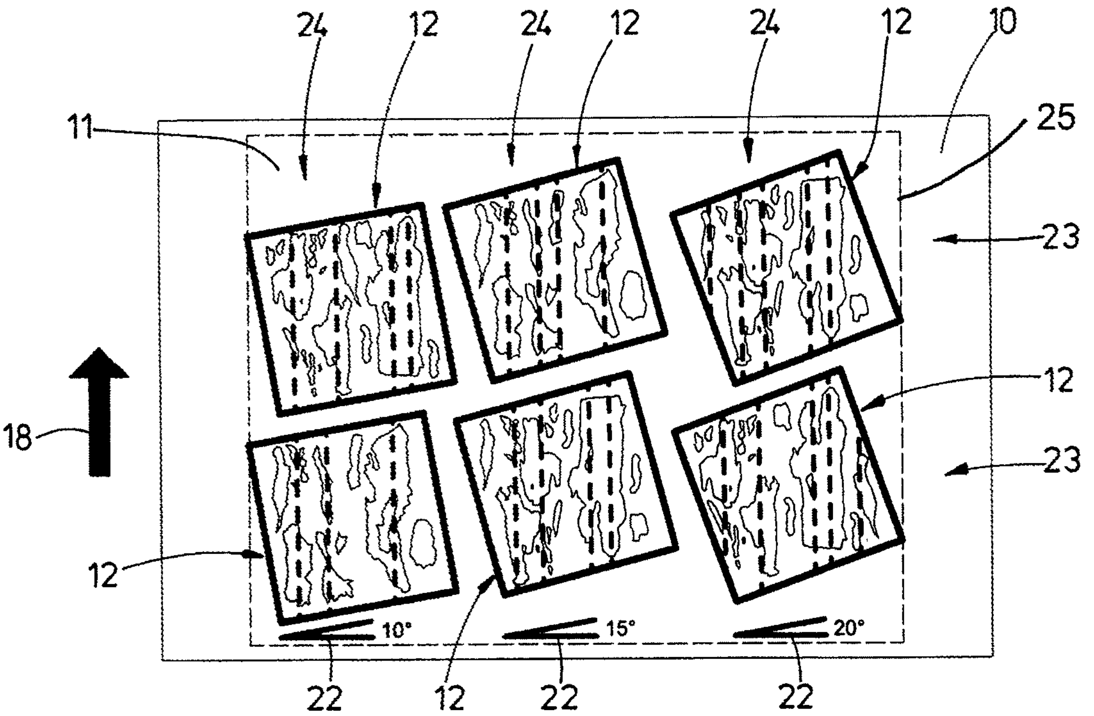
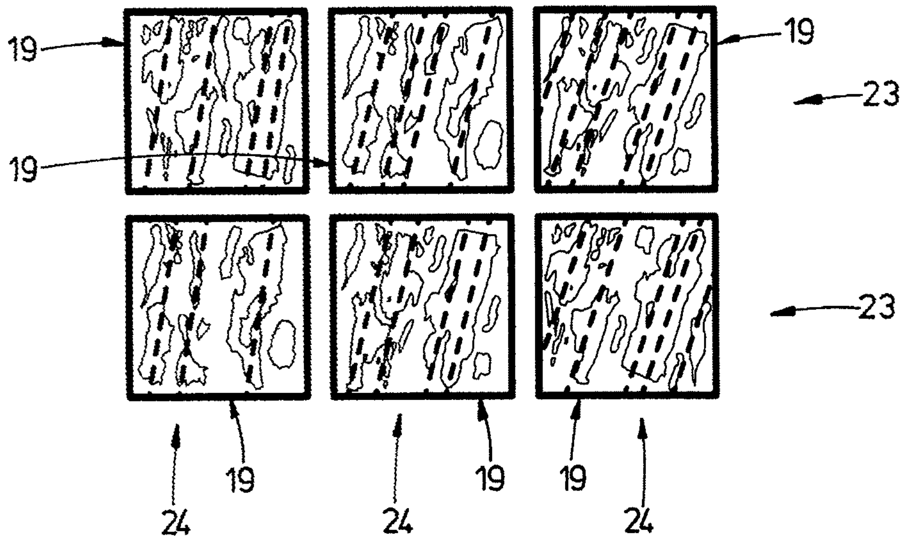
Fig. 19

DEVICE FOR PRODUCING CONCRETE BLOCKS

CROSS REFERENCE TO RELATED APPLICATIONS

This application is a continuation of and claims the benefit of and priority on U.S. patent application Ser. No. 16/645,874 having a filing date of 10 Mar. 2020, which is the US National Phase of and claims the benefit of and priority on International Application No. PCT/EP2019/054566 having an international filing date of 25 Feb. 2019, which claims priority on and the benefit of German Patent Application No. 10 2018 121 741.2 having a filing date of 6 Sep. 2018.

BACKGROUND OF THE INVENTION

Technical Field

The invention relates to a device for producing concrete blocks, in particular concrete paving slabs, having a mold for filling with a concrete mixture, wherein the mold has at least one mold cavity for receiving the concrete mixture, and wherein the upwardly open mold cavity has walls as lateral boundaries, and wherein the at least one mold cavity can be filled with the concrete mixture by means of a filling device, and wherein the mold with the at least one mold cavity and the filling device are movable relative to one another in a filling axis.

Prior Art

Devices of this type are known in numerous variants from the prior art and in practice. Thus, for example, DE 20 2013 003 472 U1 teaches the use of downwardly open filling carriages, which can be moved over a mold with one or more upwardly open mold cavities for concrete blocks, for filling the mold cavities with a concrete mixture. The document further proposes first filling in a cost-effective core concrete and then filling in one or more (multi)colored facing concretes. For this purpose, the use of a special filling carriage is proposed.

In such devices, the procedure adopted in practice is such that the mold and the filling carriage are moved relative to one another, namely in a filling axis or filling direction. Here, the filling axis or filling direction generally has a linear progression and extends parallel to a longitudinal axis of the device.

Furthermore, it is known to provide the subsequent upper side of the concrete blocks with a structure. What is generally concerned here is to structure the subsequent upper side of the concrete blocks in such a way that it resembles a natural product or a natural stone.

BRIEF SUMMARY OF THE INVENTION

Taking this as the starting point, the object on which the invention is based is to propose measures to improve the production of concrete blocks.

To achieve this object, a device according to the invention is a device for producing concrete blocks, in particular concrete paving slabs, having a mold for filling with a concrete mixture, wherein the mold has at least one mold cavity for receiving the concrete mixture, and wherein the upwardly open mold cavity has walls as lateral boundaries, and wherein the at least one mold cavity can be filled with the concrete mixture by means of a filling device, and wherein the mold with the at least one mold cavity and the filling device are movable relative to one another in a filling axis, characterized in that the filling axis is oriented obliquely to an axis of symmetry of the at least one mold cavity, with the result that preferably all the walls of the mold cavity extend neither perpendicularly nor parallel to the filling axis, but at an angle.

There is accordingly provision that the filling axis is oriented obliquely to an axis of symmetry of the at least one mold cavity, with the result that preferably all of the walls of the mold cavity extend neither perpendicularly nor parallel to the filling axis, but at an angle.

In a preferred embodiment, there can be provision that the or each mold cavity is rectangular in outline and has four walls which extend so as to be directed obliquely to the filling axis.

Alternatively, there can be provision that, with mold cavities which are square in outline, only the axes of symmetry which extend through the center points of the walls are oriented obliquely to the filling axis.

In preferred embodiments, there can be provision that the angle between the filling axis and the axis of symmetry is at least 5°, preferably between 5° and 30°, and in particular between 5° and 20°.

Most preferably, there can be provision that the device is designed to provide the concrete blocks with a surface structure, wherein a longitudinal direction of the surface structure extends so as to be directed parallel to the filling axis.

According to an advantageous development of the invention, there can be provision that the surface structure is formed by a shaping of the upper side of the concrete block, wherein the device is designed to apply the surface structure during the production of the concrete blocks.

The longitudinal direction, which extends obliquely to the upright side walls of the concrete block, of the surface structure on the upper side/visible side of the concrete block ensures that the concrete block is very similar in appearance to a natural stone. This ensures that the concrete block gives off an impression which is markedly much more natural than in the case of a parallel or perpendicular progression of the longitudinal direction of the surface structure to the filling axis. In such cases, the concrete blocks can appear unnatural, which is avoided by the solution according to the invention.

Furthermore, there can be provision that the device is designed to provide the concrete blocks with a color shade or a color tinge, wherein the device is designed to apply the color shade or the color tinge parallel to the filling axis or parallel to the longitudinal direction of the surface structure. In this way, the color shade or the color tinge follows the longitudinal direction of the surface structure, with the result that a situation cannot arise in which color shade or color tinge cannot otherwise harmonize with the structure and even work against it.

Furthermore, there can be provision that the mold has one or more mold cavities.

A further particular feature can consist in the fact that, given a plurality of mold cavities, the individual mold cavities are arranged at the same or one or more different angles to the filling axis.

Furthermore, there can be provision that a plurality of mold cavities are arranged in one or more rows and/or columns, wherein the angles of the mold cavities to the filling axis correspond to one another or differ from one another, in particular within a row and/or column or from row to row or column to column.

BRIEF DESCRIPTION OF THE DRAWINGS

Preferred exemplary embodiments of the invention will be explained below with reference to the drawings, in which:

FIG. 2 shows a first exemplary embodiment of a device according to the invention in plan view;

FIG. 3 shows a concrete block produced in the device according to FIG. 2 in plan view;

FIG. 4 shows the device according to FIG. 2 with illustration of the surface structure of the concrete block;

FIG. 5 shows the concrete block according to FIG. 3 with illustration of the surface structure;

FIG. 6 shows a combination of the illustrations according to FIGS. 2 and 4;

FIG. 7 shows a combination of the illustrations according to FIGS. 3 and 5;

FIG. 8 shows a second exemplary embodiment of a device according to the invention in plan view;

FIG. 9 shows a concrete block produced in the device according to FIG. 8 in plan view;

FIG. 10 shows the device according to FIG. 7 with illustration of the surface structure of the concrete block;

FIG. 11 shows the concrete block according to FIG. 8 with illustration of the surface structure;

FIG. 12 shows a combination of the illustrations according to FIGS. 7 and 9;

FIG. 13 shows a combination of the illustrations according to FIGS. 8 and 10;

FIG. 14 shows a third exemplary embodiment of a device according to the invention in plan view;

FIG. 15 shows a concrete block produced in the device according to FIG. 14 in plan view;

FIG. 16 shows the device according to FIG. 14 with illustration of the surface structure of the concrete block;

FIG. 17 shows the concrete block according to FIG. 15 with illustration of the surface structure;

FIG. 18 shows a combination of the illustrations according to FIGS. 14 and 16; and FIG. 19 shows a combination of the illustrations according to FIGS. 15 and 17.

DETAILED DESCRIPTION OF PREFERRED EMBODIMENTS

Figure 1:
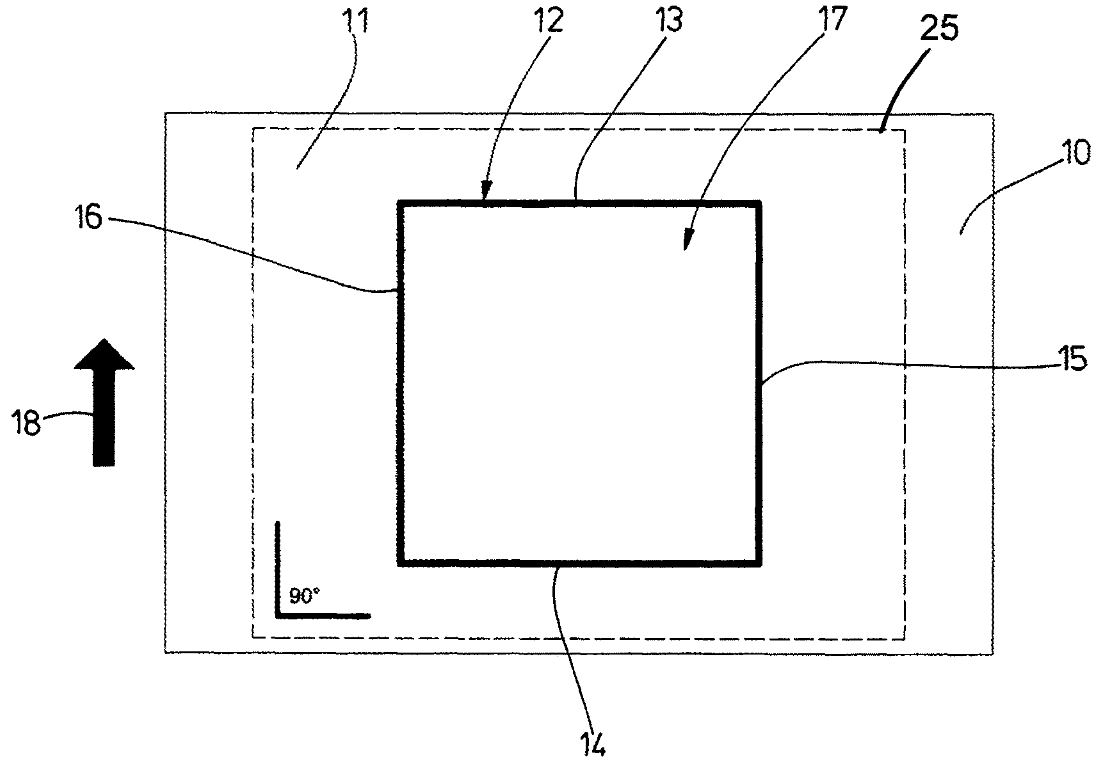
FIG. 1 shows a plan view of a production installation for concrete blocks according to the prior art.

FIG. 1 shows a device for producing concrete blocks, as is frequently used in practice. On an underlay board 10 there is situated a production zone 11 in the region of which a mold 12 is arranged. Walls 13, 14, 15, 16 of the mold 12 laterally bound a mold cavity 17 of the mold. Arrow 18 indicates a filling axis or filling direction in which the mold and a filling device 25 are moved relative to one another, for example in accordance with DE 20 2013 003 472 U1 stated at the outset.

What is of importance for the invention is the orientation of the walls 13 . . . 16 of the mold 12 with respect to the filling axis 18. All the walls 13 . . . 16 extend (with consideration to the customary manufacturing tolerances) either parallel to the filling axis 18 or perpendicularly thereto. Walls 13, 14 extend perpendicular to the filling axis 18 and walls 15, 16 extend parallel to the filling axis 18. The axes of symmetry of the mold 12 through the centers of the walls 13 . . . 16 also extend either parallel or perpendicularly to the filling axis 18. Since the mold is square in outline, the walls 13, 14 and 15, 16 respectively extend parallel to one another.

As customary in the prior art, the mold cavity 17 is filled with a concrete mixture, wherein mold cavity 17 and filling device 25 are moved relative to one another. This can be followed by further work steps, such as, for example, removing the upper side of the mold 12 and compacting the filled-in concrete mixture, for example by vibration. After the concrete mixture has cured, the concrete block 19 can be released from the mold.

FIGS. 2 to 7 show a first exemplary embodiment of the invention. A particular feature consists in the fact that the walls 13 . . . 16 of the square mold 12 extend or are arranged so as to be directed obliquely to the filling axis 18. The same applies to the axes of symmetry of the mold 12 which extend through the centers of the walls 13 . . . 16.

In the concrete case, the angle 22 between the filling axis 18 and the walls 15, 16 is 25°. As evident from the further exemplary embodiments, the angle 22 can also have other sizes.

A further particular feature is shown in FIGS. 4 and 5, namely a surface structure 20 which is formed on an upper side of the concrete block 19.

The surface structure 20 can be applied by embossing by means of a stamp or using one of the other methods customary in the art. The surface structure 20 can be formed as a structure or texture in the region of the upper side of the concrete block, and in particular recreate a corresponding structure or texture of a natural stone.

Furthermore, the surface structure 20 can be supplemented or supported by a corresponding coloring in the region of the upper side. The coloring in question can take the form of different color shades or a color tinge, for example just as in a natural stone to be simulated.

There is preferably provision that the surface structure 20 is formed by coloring and shaping the concrete block 19. Alternatively, however, only one of the two methods can be used.

A particular feature with respect to the surface structure 20 consists in the fact that it extends substantially in a longitudinal direction which extends so as to be directed substantially parallel to the filling axis 18. In the drawings, the longitudinal direction is indicated by parallel axes 21. Correspondingly, the longitudinal direction of the surface structure 20 extends obliquely, that is to say neither parallel nor perpendicularly to the walls 13 . . . 16 of the mold 12 or to the side walls of the concrete block 19. The coloring or color tinge is applied parallel to the filling axis and thus parallel to the longitudinal direction of the surface structure 20.

The second exemplary embodiment according to FIGS. 8 to 13 differs from the first exemplary embodiment in that

- three molds 12 are arranged in a row 23 in the production zone 11,
- the row 23 extends transversally to the filling axis 18,
- each mold 12 is arranged at another angle 22 to the filling axis 18,
- all the molds 12 are rectangular, and
- the angles 22 have other sizes which differ from one another, namely 8°, 10° and 15°.

The third exemplary embodiment according to FIGS. 14 to 19 has the following particular features:

- in the production zone 11 there are arranged six molds 12 in two rows 23 of three molds 12 each or in three columns 24 of two molds 12 each;
- there is an identical number of molds 12 in each row 23;

the angles 22 within each column 24 correspond to one another;

the molds 12 are square; and the angles have sizes of 10°, 15° and 20°.

At least theoretically, combinations or variants of the exemplary embodiments shown are conceivable, for example square and/or rectangular molds 12, one or more molds 12 in the production zone 11, a plurality of rows 23 and/or columns 24 with molds 12 in the production zone 11, angles 22 between 0° and 30°, and identical or different angles 22 of the molds 12.

All of the variants share the following features:

the molds 12 are arranged obliquely to the filling axis 18; and the longitudinal direction of the surface structure 20 extends parallel to the filling axis 18.

Not illustrated in the drawings are spacers which are possibly integrally formed in the region of the upright lateral faces of the concrete block 19. It will be understood that the concrete block 19 in this sense can also have other features which are not illustrated in the drawings.

LIST OF REFERENCE SIGNS

10 Underlay board
11 Production zone
12 Mold
13 Wall
14 Wall
15 Wall
16 Wall
17 Mold cavity
18 Arrow/filling axis/filling direction
19 Concrete block
20 Surface structure
21 Axis of the longitudinal direction
22 Angle
23 Row
24 Column
25 Filling device

What is claimed is:

1. A device for producing concrete blocks (19), the device having a mold (12) for filling with a concrete mixture and a filling device (25) having a filling axis (18), wherein:

the mold (12) has at least one upwardly open mold cavity (17) for receiving the concrete mixture, wherein the at least one upwardly open mold cavity (17) has walls (13, 14, 15, 16) as lateral boundaries;

the at least one upwardly open mold cavity (17) is fillable with the concrete mixture by means of the filling device (25);

the mold (12) together with the at least one upwardly open mold cavity (17) and the filling device (25) are movable relative to one another along the filling axis (18), wherein the filling axis (18) is oriented obliquely to an axis of symmetry of the at least one upwardly open mold cavity (17), with the result that all of the walls (13 . . . 16) of the upwardly open mold cavity (17) extend at an angle (22) that is between perpendicular and parallel to the filling axis (18);

the device is structured to provide a surface structure (20) to the concrete blocks (19) and to provide the surface structure (20) with a color shade or a color tinge, wherein the device is structured to apply the color shade or the color tinge parallel to the filling axis (18) or parallel to the longitudinal direction of the surface structure (20).

2. The device as claimed in claim 1, wherein the at least one upwardly open mold cavity (17) is rectangular in outline and has four walls (13 . . . 16) which extend so as to be directed obliquely to the filling axis (18).

3. The device as claimed in claim 1, wherein the at least one upwardly open mold cavity (17) is square in outline, and only the axes of symmetry which extend through the center points of the walls (13 . . . 16) are oriented obliquely to the filling axis (18).

4. The device as claimed in claim 1, wherein the angle (22) between the filling axis (18) and the axis of symmetry is at least 5°.

5. The device as claimed in claim 1, wherein the device has a plurality of the upwardly open mold cavities (17), and the individual upwardly open mold cavities (17) are arranged at the same or one or more different angles (22) to the filling axis (18).

6. The device as claimed in claim 5, wherein the plurality of the upwardly open mold cavities (17) are arranged in at least one row (23) and/or column (24), wherein the angles (22) of the plurality of the upwardly open mold cavities (17) to the filling axis (18) correspond to one another or differ from one another, within the row (23), and/or the column (24) or from row (23) to row (23) or from column (24) to column (24).

7. The device as claimed in claim 1, wherein the angle (22) between the filling axis (18) and the axis of symmetry is between 5° and 30°.

8. The device as claimed in claim 1, wherein the angle (22) between the filling axis (18) and the axis of symmetry is between 5° and 20°.

9. A device for producing concrete blocks (19), the device having a mold (12) for filling with a concrete mixture and a filling device (25) having a filling axis (18), wherein:

the mold (12) has at least one upwardly open mold cavity (17) for receiving the concrete mixture, wherein the upwardly open mold cavity (17) has walls (13, 14, 15, 16) as lateral boundaries;

the at least one upwardly open mold cavity (17) is fillable with the concrete mixture by means of the filling device (25);

the mold (12) together with the at least one upwardly open mold cavity (17) and the filling device (25) are movable relative to one another along the filling axis (18), wherein the filling axis (18) is oriented obliquely to an axis of symmetry of the at least one upwardly open mold cavity (17), with the result that all of the walls (13 . . . 16) of the mold cavity (17) extend at an angle (22) that is between perpendicular and parallel to the filling axis (18);

the device is structured to provide the concrete blocks (19) with a surface structure (20), wherein a longitudinal direction of the surface structure (20) extends so as to be directed parallel to the filling axis (18); and the surface structure (20) is formed by a shaping of an upper side of the concrete block (19), wherein the device is structured to apply the surface structure (20) during production of the concrete blocks (19).

10. The device as claimed in claim 9, wherein the device is further structured to provide the concrete blocks (19) with a color shade or a color tinge, wherein the device is further structured to apply the color shade or the color tinge parallel to the filling axis (18) or parallel to the longitudinal direction of the surface structure (20).

* * * * *